Jan. 9, 1968  W. FUELLING ETAL  3,362,747
SEAT, MORE PARTICULARLY A VEHICLE SEAT
Filed April 22, 1966  2 Sheets-Sheet 1
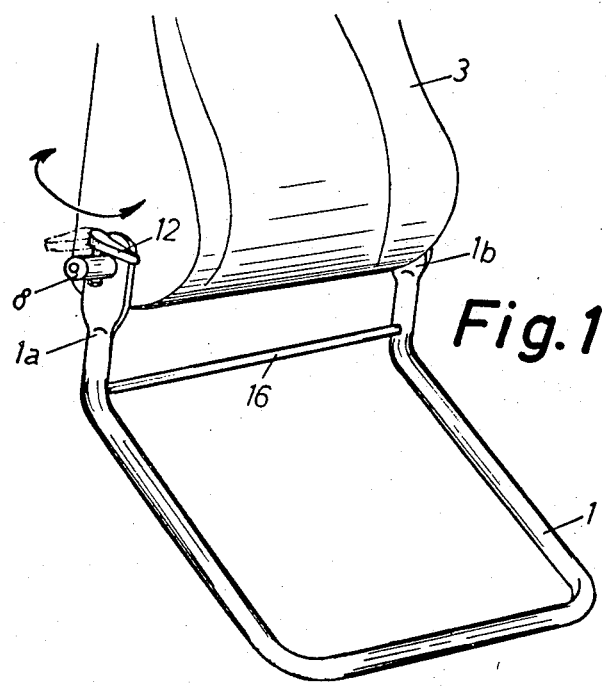
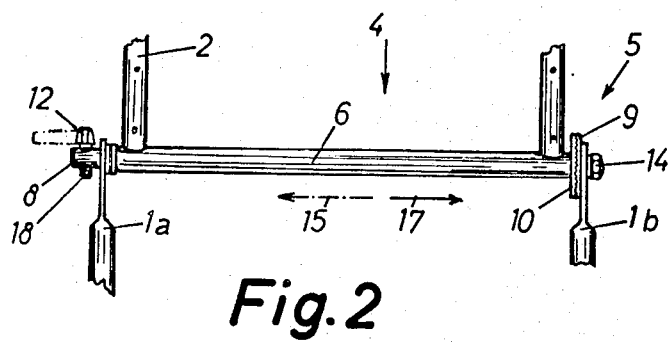
INVENTORS:
Dr. Wolfgang FUELLING
BY: Werner OSENBERG
Arthur O. Klein
their Attorney

United States Patent Office 3,362,747
Patented Jan. 9, 1968

3,362,747
SEAT, MORE PARTICULARLY A
VEHICLE SEAT
Wolfgang Fuelling, Solingen-Ohligs, and Werner Osenberg, Opladen, Germany, assignors to Bremshey & Co., Solingen-Ohligs, Germany, a firm
Filed Apr. 22, 1966, Ser. No. 544,538
Claims priority, application Germany, June 3, 1965, B 62,115
8 Claims. (Cl. 297—373)

ABSTRACT OF THE DISCLOSURE

The invention relates to seats, and in particular vehicle seats that have a tiltable back member. The latter is pivotally connected to the vehicle seat by means of a shaft and two coupling means which are adapted to mesh with each other. A coil spring is mounted between the coupling means urging them apart and simultaneously urging the back member into an upright position with respect to the seat. Cam means are connected to one of the two coupling means for moving it into or out of engagement with the other coupling means.

---

Seats of the aforedescribed character generally include a back member which can be tilted into a lying position against the action of a return spring, said back member being provided with a bearing fitted with a friction or positive coupling one half of which is attached to the frame of the horizontal part of the seat and the other half to the frame of the back member. A handle is generally provided for disconnecting the coupling by axially slidably displacing a shaft support member, the action of said handle being opposed by a spring which, consequently, serves to either disengage the coupling or to maintain it in engagement.

For the sake of convenience a seat, whether a vehicle seat or some other type of seat, which has the features set forth in the preceding paragraph is referred to below as of the type described.

In a vehicle seat of the type described, the back member can be tilted automatically forward from the upright position with the aid of a spring and backwards through a range of adjustments against the action of a spring to a lying position. The coupling between the seat frame and the back member frame is provided with either stepless adjusting means or with finely adjustably friction or locking clutch adjusting means. The two halves of the couplings are held in engagement by a spring or are moved out of engagement by the action of a spring depending on design. Thus, in the known type of vehicle seats two separate springs are required which are as follows:

(a) A spring for the automatic tilting action of the back member, and (b) A spring for either maintaining the friction or locking coupling in engagement or out of engagement. Both of these two springs take up space since they require individual mounting or suspension arrangements and means such as capsules for protecting them from dirt. Consequently, the seats of the aforedescribed type are quite costly to manufacture.

It is a general object of this invention to avoid the aforerecited drawbacks in the seats of the type described.

It is a more specific object of this invention to provide a vehicle seat which has a tiltable back member but only requires one spring member for automatically tilting the back member with respect to the seat member and for maintaining the two halves of the coupling in or out of engagement.

Accordingly, we have devised a seat of the described type which is provided with a single spring which functions both as a return spring that maintains the back member in an upright position and also as the spring that acts on the coupling itself. In this manner we have combined into one structural member what heretofore required two separate structural members, said one structural member performing all of the functions that used to be performed by said two structural members in a seat of the described type. The separate mounting or suspension arrangements and capsule for the second spring are avoided. The absence of such additional parts which would be required for the second spring and the consequent saving in space make for a considerably simplified construction of the means for adjusting and fixing the back member. Furthermore, the number of parts in the bearing itself of the seat is somewhat reduced.

We have discovered that a spiral spring element which assumes a conical shape in its unloaded condition is particularly advantageous and well adapted for the seat of our invention insofar as its installation and its operation in the seat itself is concerned.

In order to economize in space we have found it advantageous to mount the aforedescribed conically shaped spiral spring element in hollow space between the two halves of the coupling.

We have found it to be particularly advantageous to provide a handle which serves to selectively engage or disengage the coupling. In order to facilitate the operation of the handle and to reduce the amount of movement required for operating the handle, the latter is advantageously connected with an eccentric member for turning it about an axis which is perpendicular to the axis of the support shaft of the back member.

In order to make the arrangement as well designed and as free from malfunctioning as possible, it is preferred to journal it in a bush forming part of the bearing of the seat back and to provide it with an eccentric member passing into a transverse hole in the pivot pin.

The coupling will undergo a range of stress conditions and consequent wear depending on the use and, in order to adapt the means for setting the angle of the seat back to this range of stress conditions, we have provided the friction or positive coupling with adjustable means for pressing the two halves of the coupling together.

In order to make the invention clearly understood, reference will be made to the accompanying drawings which are given by way of example and in which:

FIGURE 1 illustrates in perspective a vehicle seat embodying the invention;

FIGURE 2 is a side elevation of the seat frame illustrated in FIGURE 1; and

Figure 3:
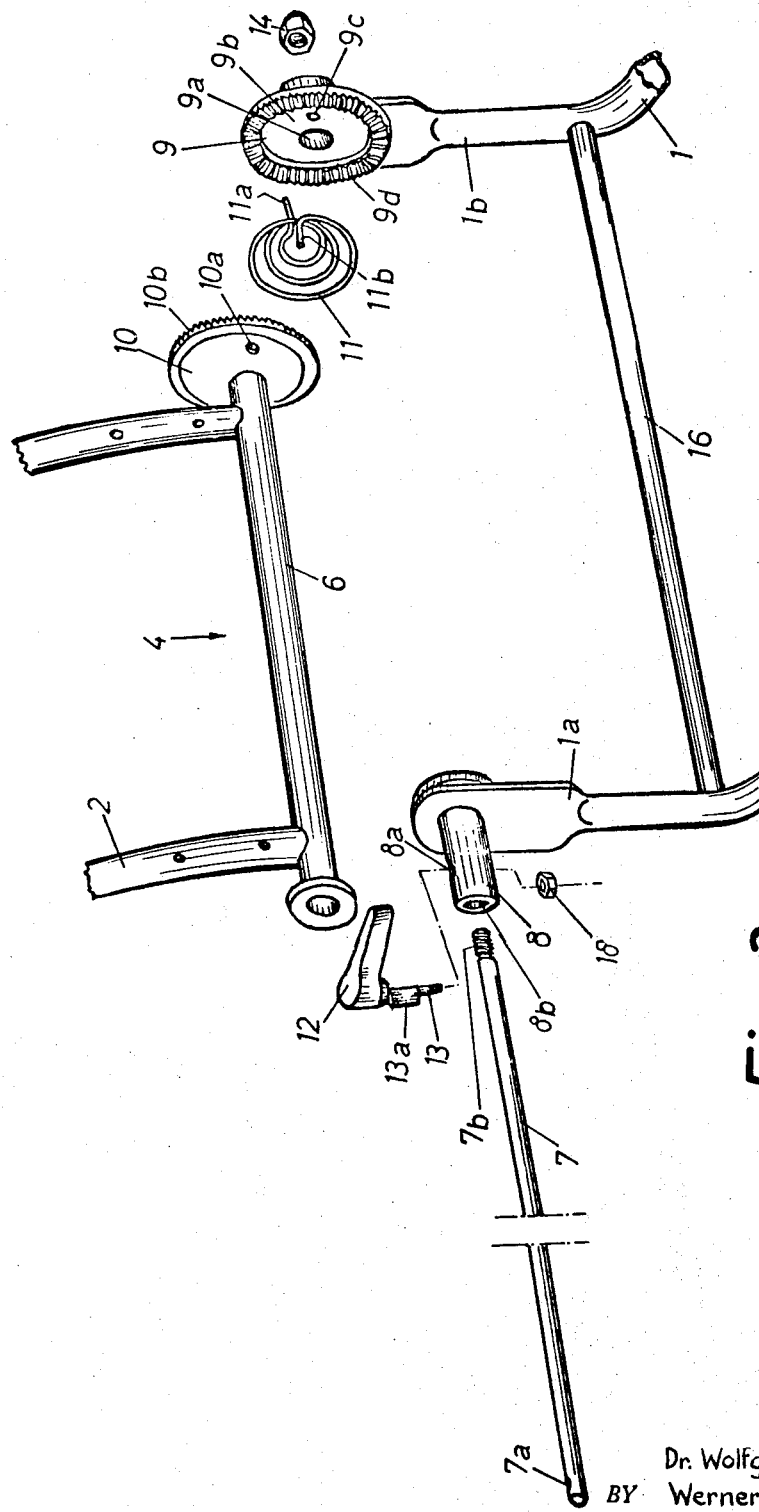
FIGURE 3 is an exploded view in perspective of the seat frame illustrated in FIGURES 1 and 2.

Referring now specifically to the drawings, there is illustrated an embodiment of this invention in the form of a vehicle seat with a frame. The frame of the seat is, as is usual in the vehicle seat manufacturing industry, made out of bent steel tubing. The overall frame of the seat consists primarily of a support V-shaped frame 1, which is mounted on the vehicle floor and which supports the seat cushion (not illustrated), and a frame 2 for supporting the back member cushion 3. The frame 2 is pivotally supported on the frame 1 by means of a bearing 4 and a fitting 5 associated therewith.

The arrangement of the bearing 4 and fitting 5 is illustrated in detail in FIGURES 2 and 3. The bearing 4 is composed of a transverse tube 6 which is welded to the frame 2. A pivot shaft 7 extends through the tube 6 and serves to pivotally support the frame 2. The pivot shaft 7 is provided with a threaded end portion 7b at one end thereof. The pivot shaft 7 is supported at one end by a bush 8, fixedly mounted on the support frame 1, and at the other end by one half of a coupling 9 which will be described in detail below. The threaded end portion 7b of the shaft 7 fits into a hole 9a of the coupling 9.

The coupling half 9, which is fixed to the frame 1, constitutes part of a conventional toothed coupling which can be disengaged by axial movement of the shaft 7. The other half 10 of the coupling is axially secured to the tube 6 of the frame 2. There is provided a machined hollow space in the coupling half 9 and a similar hollow space (not illustrated) in the coupling half 10. A coil spring 11 having a conical overall shape fits into the hollow spaces of the two coupling halves when the latter are assembled. The ends 11a and 11b of the coil spring 11 fit respectively into a hole 9c in the coupling half 9 and into a hole 10a in the coupling half 10 on the back frame. Owing to this arrangement, the coil spring 11 urges the back frame 2 to rotate back up into an upright position and also urges the teeth 9b and 10b of the coupling halves 9 and 10 out of the engagement with each other.

Thus, the coil spring 11 in the aforedescribed arrangement serves the dual function of urging the coupling halves 9 and 10 out of engagement and urging the back member 3 into the upright position (see FIGURE 1) from the tilted forward position or from the tilted backward position. In order to engage the coupling halves by moving them against the action of the spring 11, and thus fix the back at a given angle, an eccentric arrangement is provided which axially moves the pin 7 to operate the fitting 5. This eccentric arrangement is composed of a lever 12 extending from a pin 13, the latter being rotatably mounted in the transverse holes 8a of the bush 8 and has its lower threaded end retained by a unit 18. The pin 13 has an eccentric portion 13a which is positioned in a transverse hole 7a of the pivot shaft 7 so that the latter is axially shifted when the level 12 is pivoted, thereby shifting the frame 16 to which the shaft 7 is connected by means of the cap nut 14, and consequently selectively engaging and disengaging the two coupling halves. The diameter of the transverse hole 7a is such that the eccentric portion 13a of the pin 13 can rotate in it. Thus, the eccentric member 13a forms an abutment which limits the axial movement of the pivot shaft 7 due to the action of the coil spring 11, and rotation of the lever 12 and pin 13 will axially move the pivot shaft 7. The arrangement is such that, in the position of the lever 12 shown in full lines in FIGURES 1 and 2, the lever holds the coupling in engegement so that the back member is locked in position. When the lever is now pivoted to the position illustrated in dot-dash lines in FIGURES 1 and 2, the eccentric member 13a is moved out of abutting engagement with the side of the transverse hole 7a remote from the fitting 5 and the pivot shaft 7 is moved in the direction of arrows 17 (FIGURE 2) by the actions of the coil spring 11 through a distance equal to the stroke of the eccentric member and the meshing coupling teeth 10b and 9d are thereby disengaged.

The method of operation just described implies that the two ends 1a and 1b of the support frame 1 carrying the bearing arrangement for the back member must be sufficiently elastic to allow the coupling halves 9 and 10 to come into engagement. In order to permit this elastic action, the bracing member 16 must be mounted sufficiently below the free ends 1a and 1b of the frame 1 so that the free ends 1a and 1b do not exert too much resistance in the direction of the arrow 15 (FIGURE 2) when the coupling halves 9 and 10 are being engaged by the action of the handle 12.

It is self-evident that individual structural components can be modified so that the degree of elasticity of the free ends 1a and 1b of the support frame 1 is not critical for the proper functioning of the seat; thus, for example, the coupling half 9 could be axially fixedly secured to the pivot shaft 7, and, consequently, be axially movably mounted with respect to the free end 1b of the frame 1 (but not rotatably mounted with respect thereto). In order to adjust the depth of interengagement of the coupling teeth 9d and 10b (FIGURE 3) brought about by the stroke of the eccentric member 13a which exerts the required locking pressure on the coupling, and in order to make adjustments to compensate for the wear of the teeth (which has been mentioned earlier in the specification), the nut 14 screwed on the threaded end 7b of the pin can be used. Such an adjustment will bring the elastic free ends 1a and 1b closer together and thereby reduce the clearance between the teeth of the coupling halves.

It should be noted that the scope of this invention would also include an embodiment in which the coil spring 11 acts in the opposite sense, that is to say in which the coupling is engaged by the spring 11 and disengaged by the handle 12 instead of vice-versa.

Without further analysis, it will be obvious to those skilled in the art, upon a study of this disclosure, that this invention permits various modifications and alterations without omitting features which, from the standpoint of prior art, fairly constitute essentrial characteristics of the generic or specific aspects of this invention, and therefore, such modifications and alterations are intended to be comprehended within the meaning, scope and range of equivalence of the following claims.

What we claim is:

1. A seat, comprising in combination, a seat frame, a shaft slidably mounted on said seat frame, a back frame pivotally mounted on said shaft, at least one pair of mating coupling means respectively operatively connected to said back frame and said seat frame, said pair of coupling means being adapted to matingly engage each other and thereby hold said back frame at a preselected position with respect to said seat frame, biasing means mounted between said pair of coupling means and operatively connected thereto, said biasing means being adapted to preform the dual function of operatively moving said pair of coupling means apart and also of urging said back frame into an upright position with respect to said seat frame.

2. The seat as set forth in claim 1, wherein said biasing means comprise a coil spring, one end of said coil spring being connected to a first one of said pair of coupling means and the other end of said coil spring to a second one of said pair of coupling means, said coil spring having a substantially overall conical shape.

3. The seat as set forth in claim 2, wherein said pair of coupling means comprise two axially aligned wheels respectively secured to said seat frame and said back frame, each one of said wheels having a plurality of projections adapted to mesh with the projections of the other wheel.

4. The seat as set forth in claim 3, wherein said seat frame comprises a tubular projection which is in axial alignment with said transverse hollow tubular member, said shaft also extending through said hollow tubular member, said shaft having a transverse hole, said eccentric cam means including a pin rotatably mounted in said tubular projection and extending through said transverse hole, an eccentric cam member projecting from said pin into said transverse hole, and a handle, mounted on one end of said pin, whereby, when said handle is manually turned, said shaft is axially shifted by said eccentric cam member in said transverse hole of said shaft.

5. A seat, comprising in combination, a seat frame, a shaft slidably mounted on said seat frame, a back frame pivotally mounted on said shaft, said back frame comprising a traverse hollow tubular member, said shaft extending through said hollow tubular member, at least one pair of mating axially aligned wheels respectively secured to said seat frame and said back frame, each one of said wheels having a plurality of projections adapted to mesh with the projections of the other wheel, said pair of wheels being respectively operatively connected to said back frame and said seat frame, said pair of wheels being adapted to matingly engage each other and thereby hold said back frame at a preselected position with respect to said seat frame, a coil spring, having a substantially overall conical shape, mounted between said pair of wheels, one end of said coil spring being connected to a first one of said pair of wheels and the other end of said coil spring being connected to a second one of said pair of wheels, said two wheels having respectively axial holes extending therethrough, a first one of said pair of wheels being axially secured to said hollow tubular member and the second pair of wheels being secured to said seat frame in axial alignment with said first wheel, said shaft extending through said axial holes of said two wheels, and eccentric cam means rotatably mounted in said seat frame and operatively connected to said shaft for axially moving said shaft in said hollow tubular member; said coil spring being adapted to urge apart said pair of wheels and also to urge said back frame into an upright position with respect to said seat frame.

6. The seat as set forth in claim 5, wherein said shaft has a threaded end portion projecting through said second wheel, and a nut threadably mounted on said threaded end portion and abutting against said second wheel.

7. The seat as set forth in claim 5, wherein said coil spring urges said two wheels apart against the action of said eccentric cam means.

8. The seat as set forth in claim 5, wherein said coil spring urges said two wheels together against the action of said eccentric cam means.

References Cited

UNITED STATES PATENTS

| | | | |
|---|---|---|---|
| 2,361,853 | 10/1944 | Lundquist | 297—373 X |
| 2,410,088 | 10/1946 | Lundquist | 297—373 X |
| 2,660,226 | 11/1953 | Uling | 297—373 |
| 3,099,485 | 7/1963 | Beierbach et al. | 297—373 |

FOREIGN PATENTS

| | | |
|---|---|---|
| 5,103,360 | 1/1955 | Italy. |
| 1,244,382 | 9/1960 | France. |

BOBBY R. GAY, *Primary Examiner.*

FRANK B. SHERRY, *Examiner.*

G. O. FINCH, *Assistant Examiner.*